(12) United States Patent
Hiraguchi

(10) Patent No.: US 7,483,241 B2
(45) Date of Patent: Jan. 27, 2009

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 368 days.

(21) Appl. No.: 11/362,917

(22) Filed: Feb. 28, 2006

(65) Prior Publication Data

US 2006/0196985 A1    Sep. 7, 2006

(30) Foreign Application Priority Data

Mar. 3, 2005    (JP) ............................. 2005-059712

(51) Int. Cl.
*G11B 23/02* (2006.01)
(52) U.S. Cl. ..................................... 360/132
(58) Field of Classification Search ................. 360/132; 242/348, 348.3, 348.2
See application file for complete search history.

(56) References Cited

U.S. PATENT DOCUMENTS 7,016,151 B2 * 3/2006 Hoge et al. ................. 360/132
7,306,182 B2 * 12/2007 Hiraguchi .................. 242/348
7,316,367 B2 * 1/2008 Hiraguchi ................ 242/348.2

FOREIGN PATENT DOCUMENTS

JP    A 2000-11591    1/2000

* cited by examiner

*Primary Examiner*—Allen T Cao
(74) *Attorney, Agent, or Firm*—Margaret A. Burke; Sheldon J. Moss

(57) ABSTRACT

A recording tape cartridge has a door with a first guard portion provided on the upper end of the door in the height direction and having a first through-hole through which a support axis is inserted; and a second guard portion provided on the lower end of the door in the height direction and having a second through-hole through which a support axis is inserted. A torsion spring is provided between the first guard portion and the second guard portion.

20 Claims, 7 Drawing Sheets

RECORDING TAPE CARTRIDGE

CROSS-REFERENCE TO RELATED APPLICATION

This application claims priority under 35 U.S.C. 119 from Japanese Patent Application No. 2005-059712, the disclosure of which is incorporated by reference herein.

BACKGROUND OF THE INVENTION

1. Field of the Invention

The present invention relates to a recording tape cartridge used primarily in a computer and the like as a recording/playback medium, in which recording tape such as magnetic tape is wound around a single reel and accommodated inside a casing.

2. Description of the Related Art

Conventionally, a recording tape cartridge is known to be used as a data recording/playback medium for a computer and the like, where recording tape such as magnetic tape is wound around a single reel. The reel is rotatably accommodated inside the casing of the cartridge. An opening is formed in the casing of the recording tape cartridge for pulling out the recording tape, and there are cartridges provided with a door that opens and closes that opening.

Known styles of doors include sliding-type and turnable-type doors. Ordinarily, the door is urged towards the closed direction of the opening with a urging means such as a coiled spring or a torsion spring. In the case of a turnable door, for example, a torsion spring is used as the urging means. In light of compatibility factors between the torsion spring and the casing of the cartridge, the torsion spring is often arranged between the bottom end surface of the door and the bottom inner surface of the casing. That is, after the coil portion of the torsion spring is inserted and fitted on a support axis provided to protrude from the casing, the region that becomes the turning support point for the door is inserted and fit through (see, for example, Japanese Patent Application Laid Open No. 2000-11591).

SUMMARY OF THE INVENTION

Nonetheless, when this type of configuration is employed, the door is always urged upwards relative to the casing. For this reason, the door is always opened and closed in a state where the clearance between the through-hole provided at the region that acts as the turning support point of the door and the support axis inserted through the hole and the clearance in the height direction provided between the door and the casing are inclined somewhat, so there has been a problem in that the opening and closing force can vary. In other words, the conventional technology is problematic in that unnecessary rotation momentum is applied to the door thus making opening and closing (i.e., turning) of the door difficult.

The present invention was made in light of this problem, and the present invention provides a recording tape cartridge in which a turnable-type door can be smoothly opened and closed without reducing the compatibility of the torsion spring with the casing.

A first aspect of the present invention is to provide a recording tape cartridge including: a casing that rotatably accommodates a single reel around which recording tape is wound; an opening formed in the casing for pulling out the recording tape; a door that turns centered on a support axis which spans the direction of the height of the casing, and which opens and closes the opening; and a torsion spring that urges the door in the closed direction of the opening. The door includes a first guard portion set on the upper end portion of the door in the direction of the height having provided therein a first through-hole through which the support axis is inserted; and a second guard portion set on the bottom end portion of the door in the direction of the height having provided therein a second through-hole through which the support axis is inserted. The torsion spring is accommodated between the first guard portion and the second guard portion.

In the above-described aspect, the torsion spring is accommodated between the first and second guard portions so the turning door is never urged upwards or downwards relative to the casing. Accordingly, the door can be opened and closed smoothly without problems such as unnecessary rotation momentum acting upon the door occurring.

A second aspect of the present invention is to provide a recording tape cartridge including: a casing that rotatably accommodates a single reel around which recording tape is wound; an opening for pulling out the recording tape formed in the casing; a door that turns centered on a support axis which spans in the direction of the height of the casing, and which opens and closes the opening; and a torsion spring that urges the door in the closed direction of the opening. The door includes: a first guard portion set on the upper end portion of the door in the direction of the height having provided therein a first through-hole through which the support axis is inserted; a second guard portion set on the bottom end portion of the door in the direction of the height having provided therein a second through-hole through which the support axis is inserted; and a third guard portion set approximately in the center portion of the door in the direction of the height having provided therein a third through-hole through which the support axis is inserted. The torsion spring is accommodated between the third guard portion and the first guard portion or the second guard portion.

With the above-described aspect, the torsion spring inserted and fit on the support axis does not move in the up and down directions (i.e., in the height direction) due to the third guard portion, which is provided approximately in the center of the height direction of the door. This ensures that the urging force of the torsion spring relative to the door acts upon the approximate center portion of the door with certainty. Accordingly, the door can be stabilized and opened and closed smoothly. Further, by providing the third guard portion, a latching unit for latching one end of the torsion spring becomes unnecessary.

BRIEF DESCRIPTION OF THE DRAWINGS

Preferred embodiments of the present invention will be described in detail based on the following figures, wherein.

DETAILED DESCRIPTION OF THE INVENTION

Figure 1:
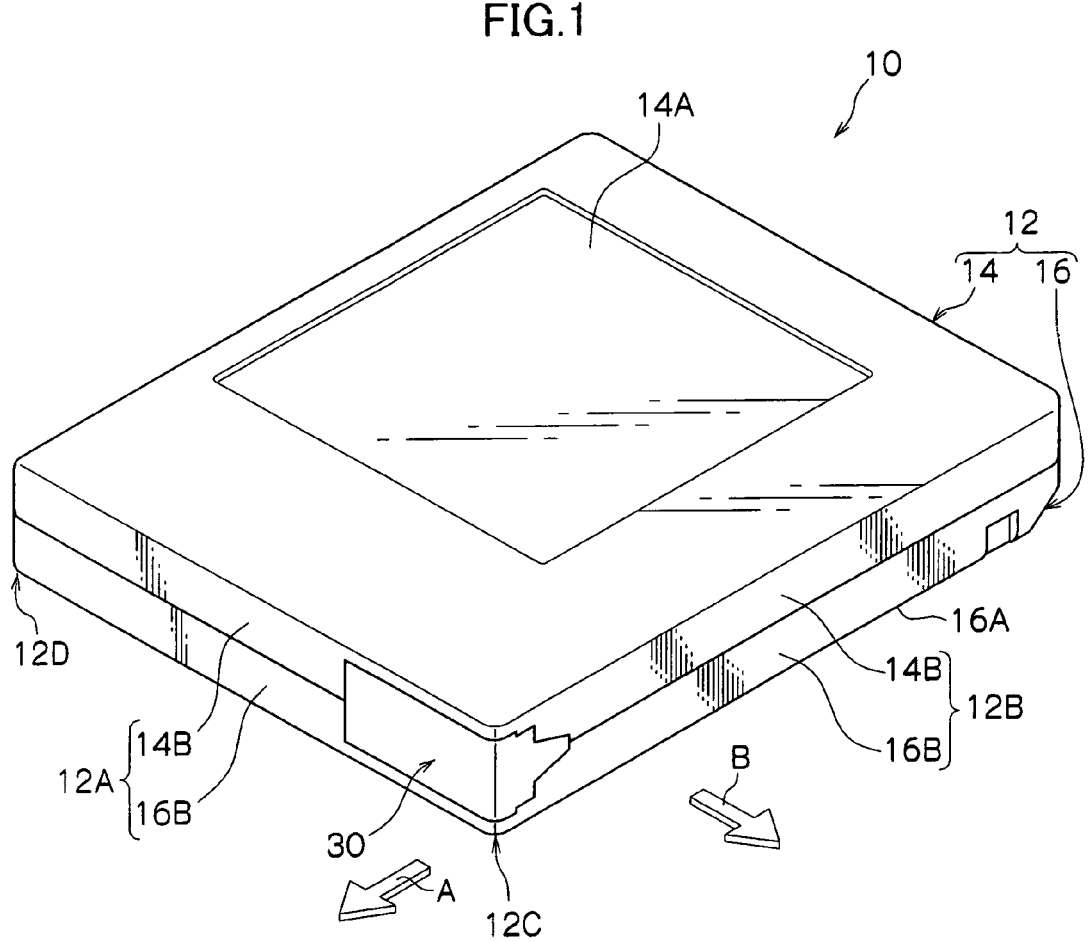
FIG. 1 is an outline perspective drawing of a tape cartridge.
Figure 2:
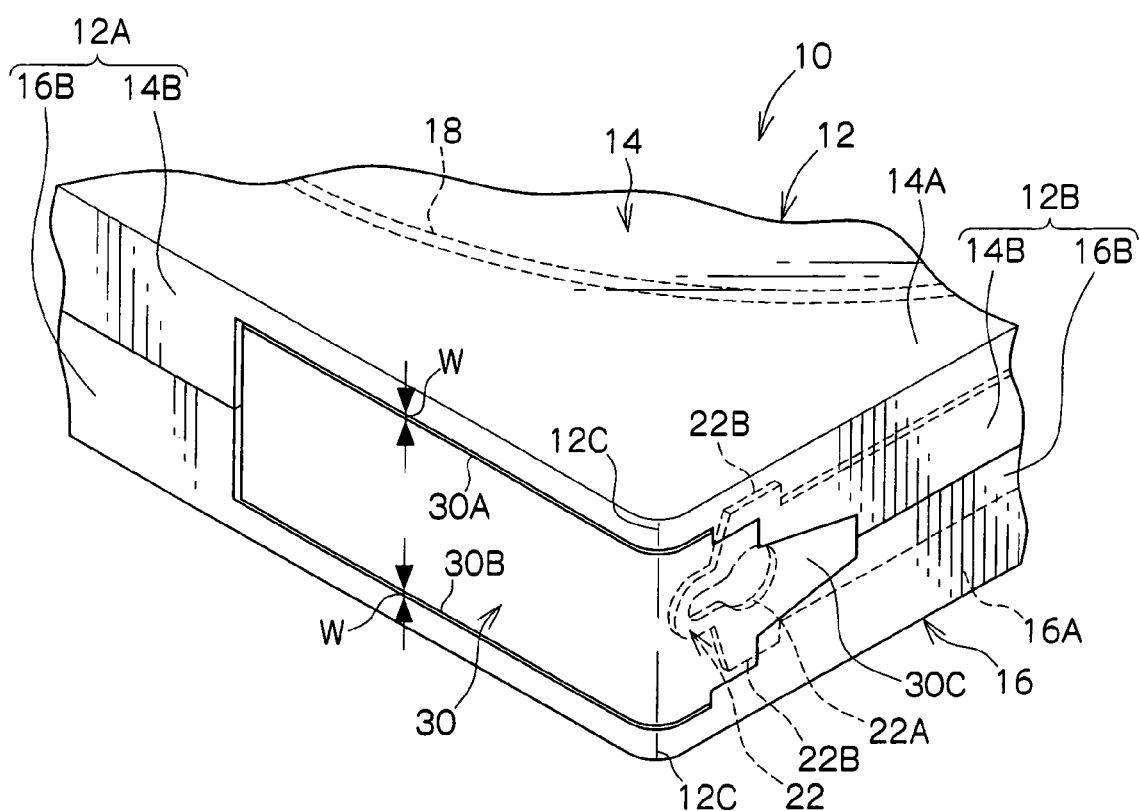
FIG. 2 is an outline perspective drawing of the vicinity of the opening of the tape cartridge when the opening is shut.
Figure 3:
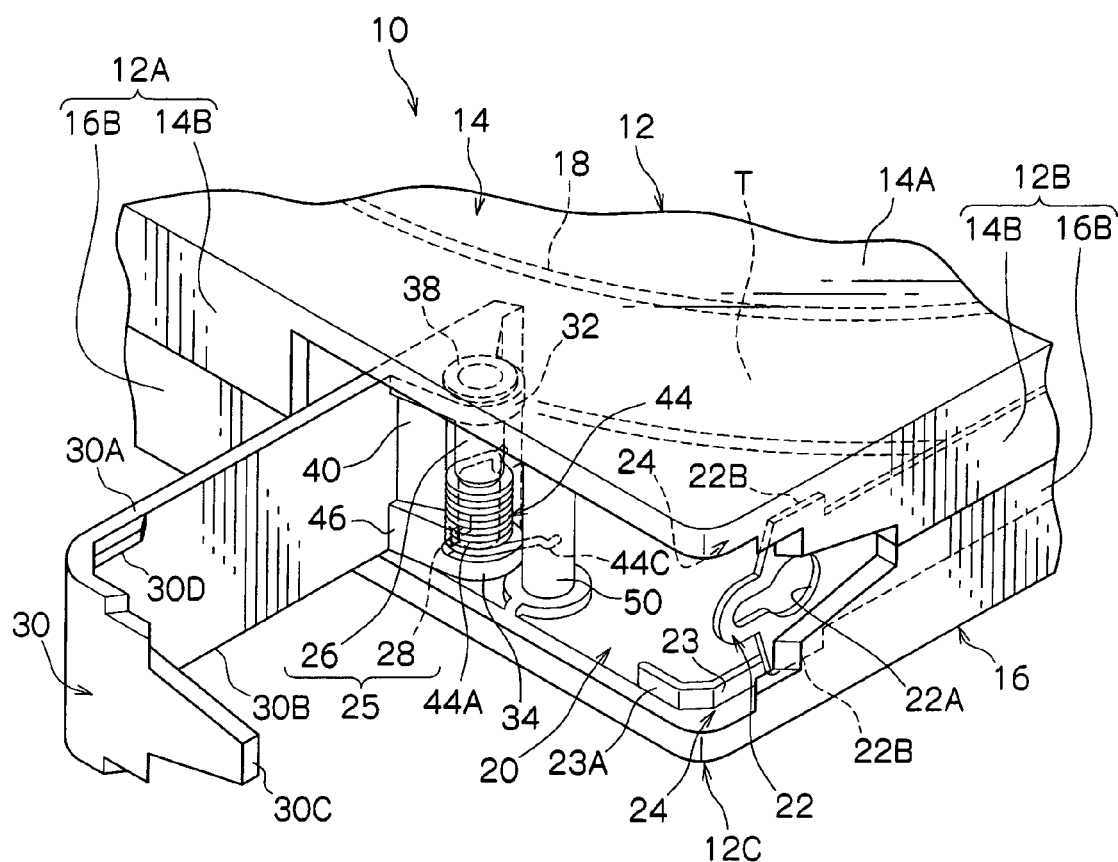
FIG. 3 is an outline perspective drawing of the vicinity of the opening of the tape cartridge when the opening is opened.
Figure 4:
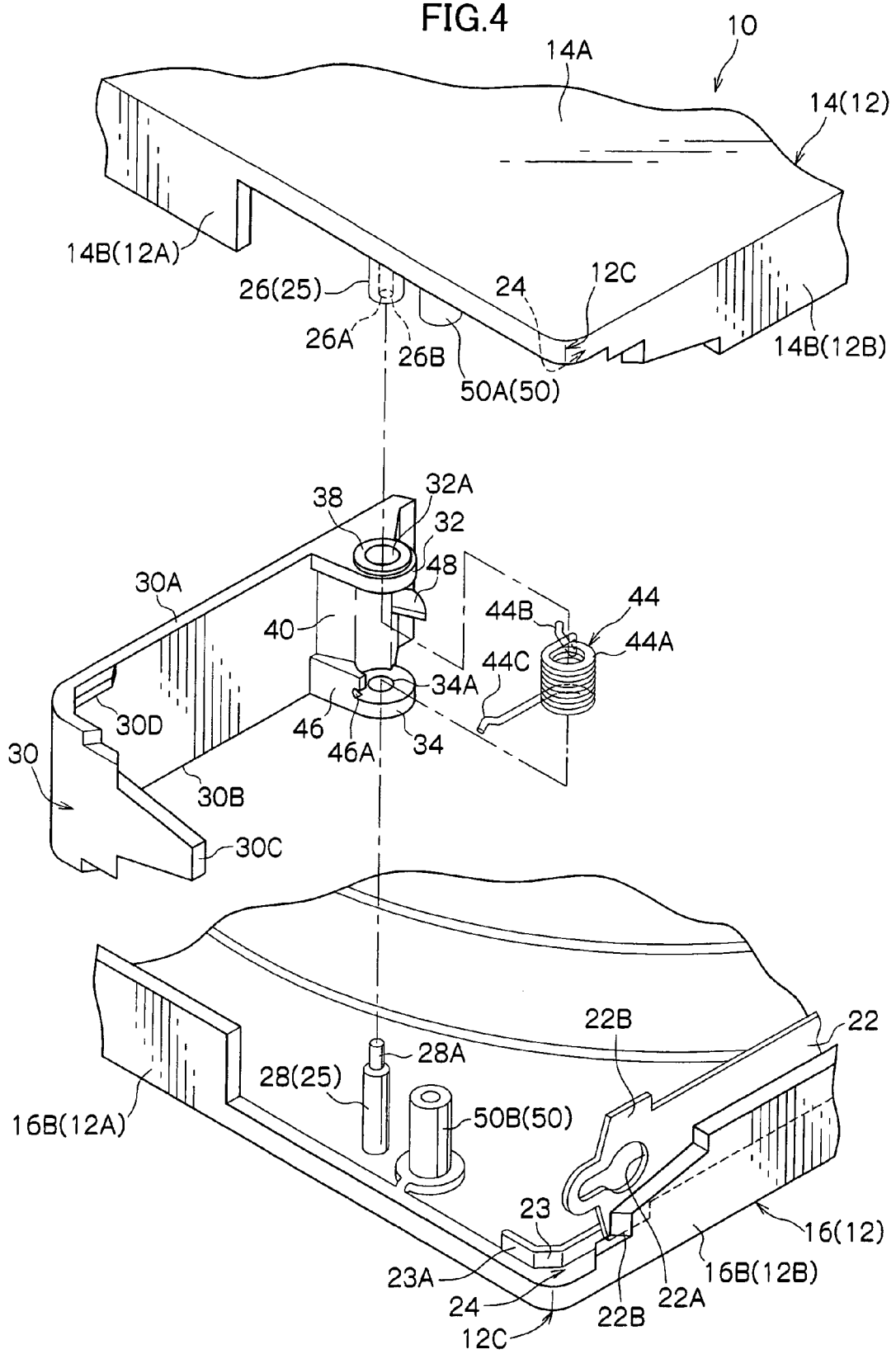
FIG. 4 is an exploded perspective drawing of the vicinity of the opening showing the door.
Figure 5:
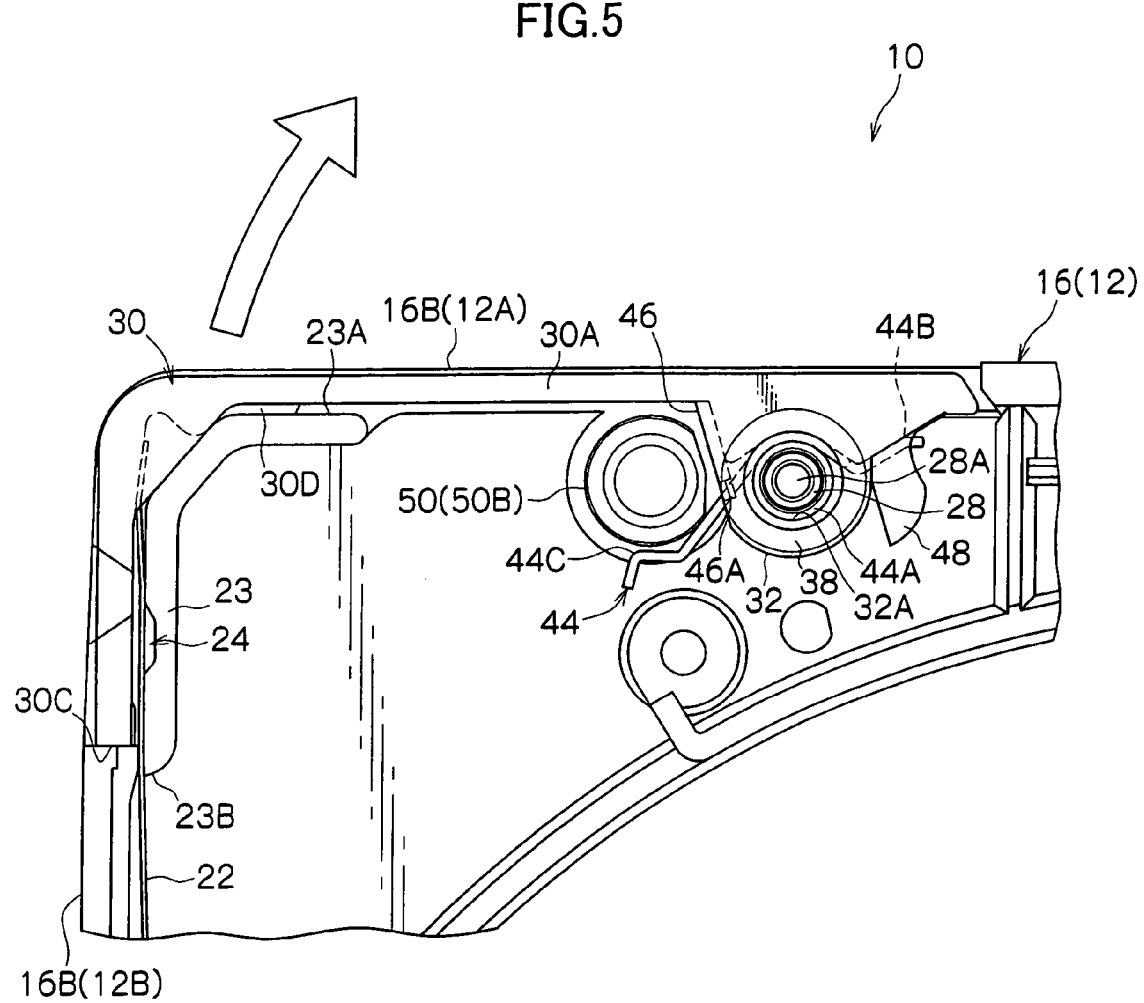
FIG. 5 is an outline planar drawing of the vicinity of the opening of the tape cartridge when the opening is shut.
Figure 6:
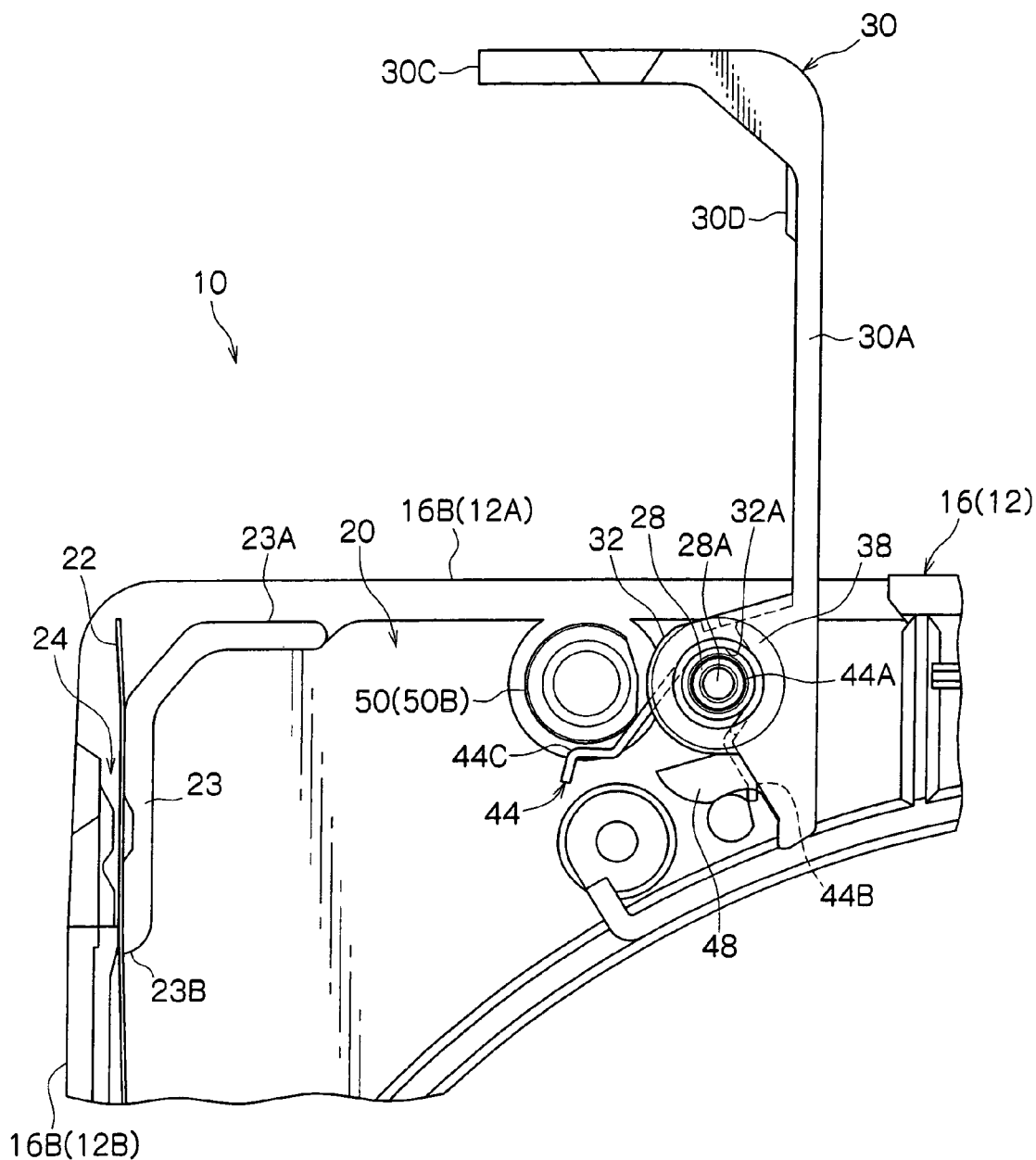
FIG. 6 is an outline planar drawing of the vicinity of the opening of the tape cartridge when the opening is opened.

Hereafter, the best modes for practicing the present invention will be explained in detail based on the embodiments shown in the drawings. FIG. 1 is an outline perspective drawing showing the recording tape cartridge of the present invention, and FIGS. 2 and 3 are outline perspective drawings of the vicinity of the tape cartridge opening. Further, FIG. 4 is an outline exploded perspective drawing of the vicinity of the opening and FIGS. 5 and 6 are outline planar drawings of the vicinity of that opening. For ease of explanation, the loading direction of the recording tape cartridge towards the drive device is indicated in the drawings with an arrow marked "A" making the front direction, and the "B" arrow shows the left direction. Based on these standards, directions will be expressed as front/rear, left/right, and up/down.

As shown in FIGS. 1-4, the recording tape cartridge 10 has a substantially rectangular box-shaped casing 12. This casing 12 includes a top casing 14 and a bottom casing 16 made from a synthetic resin of polycarbonate (PC) and the like in a state where these are respectively joined together with screws, where a peripheral wall 14B provided so as to extend from the periphery edge of a top panel 14A is brought into contact with a peripheral wall 16B provided so as to extend from the periphery edge of a bottom panel 16A. It should be noted that the means for joining the top casing 14 and the bottom casing 16 are not limited to screws or screw clamps. For example, these can be joined by other means such as supersonic wave adhesion and the like.

A rotatable single reel 18 is accommodated rotatably in the interior of the casing 12 (portions of this are shown in FIGS. 2 and 3). A recording tape T of magnetic tape and the like is wound around the reel 18 and acts as a data recording/playback medium. Further, a reel gear (not shown) is formed so as to have a circular shape at the bottom surface of the reel 18 and the reel 18 is exposed from a gear opening (not shown) provided at the bottom casing 16.

An opening 20 for pulling the recording tape T wound around the reel 18 out to the exterior is formed in the vicinity of a corner 12C towards the front-left side of the recording tape cartridge 10. That is, the opening 20 is formed so as to span from a front wall 12A to a left side wall 12B adjoining the corner 12C. The device is configured such that a leader tape 22 that is arranged along the left side wall 12B and to which an end of the recording tape T is fixed can be pulled out from the opening 20.

It should be noted that references to the corner 12C indicate the ridge line portions where the front wall 12A and left side wall 12B, when viewed from a planar view, form a substantially right angle in the peripheral wall 14B and peripheral wall 16B of the substantially rectangular box-shaped casing 12. Further, the opening 20 is not limited to being provided in the vicinity of the corner 12C in the front left side. For example, there are cases where it can be provided in the vicinity of the front right side corner 12D.

Further, the leader tape 22 is a component that is pulled out by the drive device with a pull-out component (not shown) that latches to the recording tape T in order to pull the tape out, and a hole 22A where the pull-out component latches to is provided in the vicinity of the end of the leader tape 22. Extensions 22B that respectively extend in the up and down directions are formed at both the upper and lower sides slightly towards the rear side (from the end vicinity of the leader tape 22) of the end of the hole 22A.

These extensions 22B are accommodated in (i.e., inserted into) a slot 24 respectively formed by the inner surface of the top panel 14A of the top casing 14 and the bottom panel 16A of the bottom casing 16, whereby the leader tape 22 is retained within the casing 12.

That is, this slot 24 includes the left side wall 12B and a restricting wall 23 provided so as to stand at a preset interval from the left side wall 12B. As shown in FIGS. 5 and 6, the rear end of the restricting wall 23 is provided so as to continue uniformly with the left side wall 12B, thus making a rear wall 23B that seals off the rear side. Accordingly, the leader tape 22 is arranged along the left side wall 12B in a state where the positions of the extensions 22B are restricted by the rear wall 23B.

Further, the front end of the restricting wall 23 is formed so as to curve substantially with the shape of the casing 12, and the front side of the slot 24 is made to face and open towards the opening 20. This opening 20 is sealed by a door 30 when the recording tape cartridge 10 is not in use. This door 30 has a form that is substantially the same as that of the opening 20 and is shaped so as to form an approximate L shape in plane view.

Further, a protrusion 30D that contacts a front surface 23A of the restricting wall 23 bent towards the side of the front wall 12A when the opening 20 is closed is uniformly formed at the inner surface of the door 30 at upper and lower portions on the right side of the region of the door 30 where the door 30 curves. A tip portion 30C of the left side wall 12B of the door 30, when viewed from its surface, is formed so as to have a approximately trapezoidal shape. It should be noted that it is preferable that the door 30 be formed from an olefin series resin such as polyoxymethylene (POM), however, the door 30 can also be made from resins such as PC-type resins and metals such as SUS-type metals.

Further, a support axis 25 that acts as the turning support point of this door 30 is arranged to project from both the top casing 14 and the bottom casing 16 at the front wall 12A side thereof. As shown in FIG. 4, this support axis 25 includes a cylindrical boss 26 on the top casing 14 side and a two-stepped circular pillar-shaped protruding axis 28 on the side of the bottom casing 16. A tip 28A (i.e., an upper end portion) of the protruding axis 28 made to have a smaller diameter fits into (i.e., is inserted into) a hole 26A formed in the boss 26 having a preset clearance in the diameter direction, thus forming the support axis 25.

It should be noted that the outer diameter of the boss 26 is made to be slightly larger than the outer diameter of the protruding axis 28 (excluding the tip 28A). As will be described later, the boss 26 is designed so as to be able to retain a torsion spring 44. Further, the height of the boss 26 is approximately the same as that of the peripheral wall 14B and the height of the protruding axis 28, not including the tip 28A portion, is approximately the same height as that of the peripheral wall 16B. That is, this is configured such that, when viewed from the side, the boss 26 and protruding axis 28 are joined (i.e., fit together) at a height that is at approximately the same position as the parting line of the casing 12.

Similarly board-shaped rotation rubbing units 32, 34 (i.e., guard portions) are provided parallel to each other at the upper and lower ends of the right end portion vicinity and the inner surface of the door 30 (i.e., at a position displaced by a preset distance to the left of the right end portion). As shown in FIG. 4, the support axis 25 (i.e., the boss 26 and the protruding axis 28, excluding the tip 28A portion) has a preset clearance with each of the rotation rubbing units 32, 34, which have a respective through-holes 32A, 34A formed therein through which the support axis 25 is inserted.

Accordingly, the diameters of the through-holes 32A, 34A each respectively correspond to the outer diameters of the boss 26 and the protruding axis 28 (excluding the tip 28A) and are thus different from each other. In other words, the diameter of the through-hole 32A through which the boss 26 is inserted is larger than the diameter of the through-hole 34A through which the protruding axis 28 is inserted. The configuration is such that the boss 26 is inserted through the through-hole 32A and the protruding axis 28 is inserted through the through-hole 34A, whereby the door 30 is turnably supported.

Further, annular protrusions 38 of a preset height are formed on the upper surface (i.e., external surface) of the rotation rubbing unit 32 provided on the upper end portion of the door 30 and on the bottom surface (i.e., external surface) of the rotation rubbing unit 34 provided on the lower end portion of the door 30, respectively around the through-holes 32A, 34A. The annular protrusions 38 respectively contact the inner surface of the top panel 14A of the top casing 14 and the inner surface of the bottom panel 16A of the bottom casing 16. Due to this, respective gaps W of approximately 0.3-0.5 mm (i.e., clearances in the height direction) are formed between the top edge surface 30A of the door 30 and the inner surface of the top panel 14A of the top casing 14, and between the bottom edge surface 30B of the door 30 and the inner surface of the bottom panel 16A of the bottom casing 16 (refer to FIG. 2).

Furthermore, as shown in FIGS. 3-6, a protruding ridge 40 that, when viewed from a planar cross-sectional view, appears as circularly curved approximately along the peripheral surface of the support axis 25 (i.e., the boss 26 and protruding axis 28) is formed at the inner surface of the door 30 between the rotation rubbing units 32, 34. A coil 44A of the torsion spring 44 that regularly pushes or urges the door 30 towards the closed direction of the opening 20 is inserted and fit onto the support axis 25 (i.e., the protruding axis 28).

That is, the bottom surface (i.e., end surface) 26B around the hole 26A of the boss 26 overhangs annularly around the protruding axis 28. The through-hole 34A of the rotation rubbing unit 34 is formed so that its diameter is smaller than that of the through-hole 32A to the extent that the protruding axis 28 has a preset clearance that allows it to be inserted through. Accordingly, the lower end of the coil 44A can be supported by the rotation rubbing unit 34 around the through-hole 34A and the upper end of the coil 44A can be restricted by the bottom surface (i.e., end surface) 26B of the boss 26. In other words, the device is configured so that the torsion spring 44 can be accommodated and retained between the rotation rubbing unit 34 and the boss 26.

Moreover, one end and the other end of the torsion spring 44 are curved at preset angles. A bent portion 44B formed at one end of the torsion spring 44 is latched to the approximate center portion of the door 30 (i.e., to the protruding ridge 40) and a bent portion 44C formed at the other end is latched to a screw boss 50 of the casing 12 (i.e., the torsion spring 44 is set on the side of the bottom casing 16 so this refers to the screw boss 50B provided so as to protrude from the bottom casing 16 shown in FIG. 4).

Further, as shown in FIG. 4, a latch rib 46 (i.e., a temporary retaining unit) has a slit 46A for temporarily retaining the other end of the torsion spring 44 and is provided so as to protrude at the lower left side of the protruding ridge 40 of the door 30. A latching protrusion 48 that latches one end of the torsion spring 44 is provided so as to protrude at approximately the center portion in the height direction of the protruding ridge 40 of the door 30. Due to this, the compatibility of the assembly structure of the door 30 and the torsion spring 44 relative to the casing 12 is improved.

That is, when the door 30 and the torsion spring 44 are set into the casing 12, one end formed from the bent portion 44B is made to latch to the latching protrusion 48 of the door 30 and the other end formed from the bent portion 44C is made to latch to the slit 46A of the latch rib 46, and in this state, the coil 44A is pressed towards the side of the protruding ridge 40, whereby the torsion spring 44 is retained. If the door 30 and the torsion spring 44 are both pressed to fit onto the protruding axis 28 provided so as to protrude from the bottom casing 16, the door 30 and the torsion spring 44 can be attached to the casing 12 with relative ease.

Next, the operation of the recording tape cartridge 10 provided with the door 30 configured as described above will be described. The door 30 closes or seals the opening 20 when this recording tape cartridge 10 is not in use (i.e., when not loaded into the drive device). Also, at this time the extensions 22B of the leader tape 22 are accommodated within (i.e., inserted into) the slot 24 and retained and the leader tape 22 is arranged along the left side wall 12B.

Here, when impact due to, for example, the device being dropped hits the vicinity of the corner 12C of the casing 12, that impact force is received at the screw boss 50. In other words, the screw boss 50 is provided independently from the support axis 25 and arranged in the proximity of the support axis 25 (i.e., a little less that half the direction in a straight line between the screw boss 50 and another screw boss (not shown) set separately but nearby). Due to this, the impact force generated such as when the device is dropped can be received at the screw boss 50 such that the force is not directly conveyed to the support axis 25. Accordingly, this design allows for damage to the support axis 25, such as permanent deformation and the like, to be deterred while ensuring that such impact does not affect the opening and closing of the door 30.

When recording data to the recording tape T of the recording tape cartridge 10, or when playing back data recorded on the recording tape T of the recording tape cartridge 10, the recording tape cartridge 10 is loaded into a drive device (not shown). That is, the recording tape cartridge 10 is inserted into a loading port (not shown) of the drive device from the side of the front wall 12A.

When inserted, an opening/closing component (not shown) of the drive device approaches, relatively with the progression of the loading action, and comes into contact with the right end portion of the door 30 (i.e., further to the right than the support axis 25) and presses against it. When the opening/closing component presses against the right end portion of the door 30, the door 30 resists the urging force of the torsion spring 44 and rotates in the direction of the arrow shown in FIG. 5 (i.e., in the clockwise direction) around the support axis 25 and then the opening 20 is opened, as shown in FIG. 6.

It should be noted that at this time, one end of the torsion spring 44 is latched to the latching protrusion 48 and positioned approximately in the center in the height direction of the door 30, so the urging force of the torsion spring 44 also acts upon the approximate center in the height direction of the door 30. Accordingly, the door 30 can be turned stably. That is, problems such as unnecessary rotational momentum acting upon the door 30 do not occur so the door 30 can be made to turn smoothly.

A gap W of about 0.3-0.5 mm is formed respectively between the top edge surface 30A of the door 30 and the inner surface of the top panel 14A of the top casing 14, as well as between the bottom edge surface 30B of the door 30 and the inner surface of the bottom panel 16A of the bottom casing 16 due to the annular protrusions 38. In other words, the only components of the door 30 that are in contact with the top casing 14 and the bottom casing 16 are the annular protrusions 38. Accordingly, the door 30 can be turned with little rubbing or abrasive resistance. That is, due to this configuration, the door 30 can be turned even more smoothly.

It should be noted with this door 30, it is preferable that, at the very least, the rotation rubbing units 32, 34 and the annular protrusions 38 be made from an olefin series resin such as POM. The reason is that the rubbing resistance of these components relative to the top casing 14 and the bottom casing 16 made from the synthetic resin of a PC can be further reduced while reducing the rubbing resistance relative to the support axis 25.

Further, one end and the other end of the torsion spring 44 latched to the door 30 and the casing 12 (i.e., the screw boss 50) are respectively the bent portions 44B, 44C, so even when one end and the other end of the torsion spring 44 rub against the door 30 and the casing 12 (i.e., the screw boss 50) with the turning of the door 30, there is no risk of that end scraping into the door 30 or the casing 12 (i.e., the screw boss 50). Accordingly, no adverse effects are imparted to the recording tape T due to shavings from wear and tear and the like.

In this manner, when the door 30 turns and the opening 20 is opened, the pullout component (not shown) of the drive device approaches the opening 20 from the left side wall 12B side and engages the hole 22A of the leader tape 22. At this time, the rear direction side including the hole 22A of the leader tape 22 is in a state of extremely close standby with the left side wall 12B, so the pullout component can engage with the hole 22A with certainty.

Once the pullout component has engaged with the hole 22A, the leader tape 22 is pulled out from the interior of the casing 12 by the pullout component pulling away from the opening 20. Then the leader tape 22 pulled out from the interior of the casing 12 is wound around a wind-up reel (not shown) of the drive device.

Meanwhile, a drive gear (not shown) of the drive device proceeds from a gear opening (not shown) and meshes with a reel gear (not shown) of the reel 18 of the recording tape cartridge 10. Accordingly, the recording tape T is sequentially sent out towards the side of the drive device due to the wind-up reel and the reel 18 rotating in unison, whereby recording of data to the recording tape T or playback of data recorded on the recording tape T is performed with a recording/playback head (not shown) of the drive device.

After that, when removing the recording tape cartridge 10 from the drive device, first the reel 18 is rewound and the leader tape 22 is removed from the wind-up reel and returned to the inside of the casing 12 from the opening 20. Then the extensions 22B are accommodated in (i.e., inserted into) the slot 24 and retained at preset positions inside the casing 12. Further, after the meshing of the reel gear and the drive gear is released, the recording tape cartridge 10 is removed from the loading port, and with this removing action, the open/close component moves away from the right end side of the door 30.

Once this occurs, the door 30 turns centered on the support axis 25 in the opposite direction of the arrow shown in FIG. 5 (i.e., in the counterclockwise direction) due to the urging force of the torsion spring 44, whereby the opening 20 is closed. At this time, as described above, one end of the torsion spring 44 (i.e., the bent portion 44B) can best convey the urging force of the torsion spring 44 to the door 30 because the bent portion 44B is latched at approximately the center portion of the door 30 in the height direction thereof. That is, the door 30 is stabilized and turned smoothly because undue turning momentum is not applied to the door 30. In this manner, the opening 20 is closed with the door 30 and the recording tape cartridge 10 is ejected from the drive device.

Figure 7:
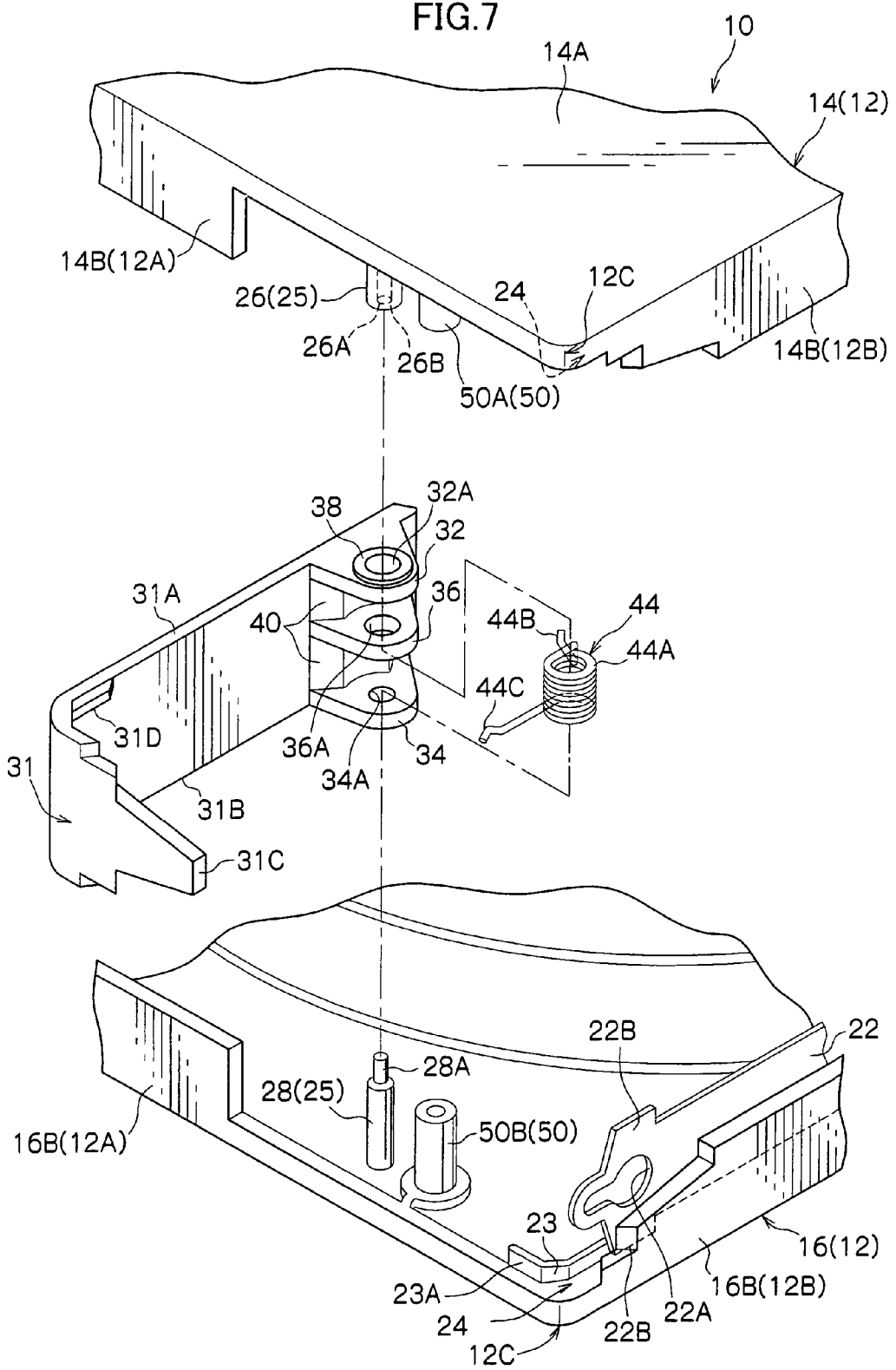
FIG. 7 is an exploded perspective drawing showing an alternative example of a door in the vicinity of the opening.

Next, an alternative example of the door 30 will be explained based on FIG. 7. In a door 31 showed in this example, the rotation rubbing units 32, 34 and a similarly board-shaped rotation rubbing unit 36 are provided so as to protrude parallel to each other at approximately the center portions of the door 31 in the height direction thereof. Also, another point that differs from the above-described door 30 is that the latch rib 46 (and slit 46A) and the latching protrusion 48 are not provided thereon. Accordingly, the other components in the present embodiment have been assigned the same codes (including English characters) as in the first embodiment and detailed explanations thereon have been omitted.

The rotation rubbing unit 36 of this door 31 is set at a position (i.e., the same position as the above-described latching protrusion 48) that is shifted slightly to the lower side of the center portion in the height direction of the door 31 (i.e., on the protruding axis 28). A through-hole 36A is provided through the rotation rubbing unit 36 so as to have a preset clearance with the protruding axis 28 that is inserted and fit through it. Accordingly, the through-hole 36A has the same diameter as the through-hole 34A of the rotation rubbing unit 34. The top end of the coil 44A of the torsion spring 44 is restricted around the through-hole 36A of the rotation rubbing unit 36 and the lower end of the coil 44A is in a state where it is supported around the through-hole 34A of the rotation rubbing unit 34, whereby in this state, the torsion spring 44 is accommodated and retained between the rotation rubbing unit 34 and the rotation rubbing unit 36.

Further, when this door 31 and torsion spring 44 are assembled to the casing 12, firstly, the coil 44A of the torsion spring 44 is accommodated between the rotation rubbing unit 34 and the rotation rubbing unit 36, then pressed towards the side of the protruding ridge 40 and retained. Then, in this state, the door 31 and the torsion spring 44 can be fitted through the protruding axis 28 together and the other end of the torsion spring 44 (i.e., the bent portion 44C) latched to the screw boss 50 (i.e., the screw boss 50B). Accordingly, problems such as deterioration of the assembling compatibility of the torsion spring 44 with the casing 12 do not occur.

Further, the other end of the torsion spring 44 that applies urging force to the door 31 is retained at a position in proximity with the rotation rubbing unit 36 arranged approximately at the center portion in the height direction of the door 31 so, as with the door 30, unnecessary rotational momentum is not applied to the door 31. It should be noted that it is a given that this door 31 can also be configured such that the above-described latch rib 46 (and slit 46A) and the latching protrusion 48 are provided so as to protrude so that one end and the other end of the torsion spring 44 can be latched thereto.

In either case, the turnable doors 30, 31 provided at the recording tape cartridge 10 are configured as described above so that the opening and closing of the doors 30, 31 can be smoothly stabilized. It should also be noted that since the rotation rubbing unit 36 is provided at the door 31, the height of the coil 44A of the torsion spring 44 (i.e., the number of times it is wound) is restricted, however, since the rotation rubbing unit 36 is not provided at the door 30, the height of the coil 44A in the door 30 is not thus limited. Accordingly, when it is necessary to adjust the urging force of the torsion spring 44 (i.e., make it stronger by increasing the number of times the coil 44A is wound) then use of the door 30 can be applied.

Furthermore, in the above-described embodiments, the boss 26 was provided to protrude from the top casing 14 and the protruding axis 28 was provided to protrude from the bottom casing 16, however, these can be reversed such that the protruding axis 28 is provided at the top casing 14 and the boss 26 is provided at the bottom casing 16. In this case, the configurations of the doors 30, 31 can be reversed from top to bottom. In other words, the latch rib 46 can be set on the upper side of the rotation rubbing unit 32 and the position of the rotation rubbing unit 36 can be shifted to the side of the top casing 14. With this configuration, the torsion spring 44 is set on the side of the top casing 14 and the bent portion 44C of the other end of the torsion spring 44 thus becomes latched to the screw boss 50A on the top casing 14 side. Nonetheless, the fact that the bent portion 44B of the other side of the torsion spring 44 is retained towards the middle of the doors 30, 31 in the height direction does not change, so the opening and closing motions of the 30, 31 can still be smoothly stabilized.

This concludes the explanations of the present invention regarding the specified embodiments, however, these examples should not be interpreted as limiting the present invention thereto.

A first aspect of the present invention is to provide a recording tape cartridge including: a casing that rotatably accommodates a single reel around which recording tape is wound; an opening formed in the casing for pulling out the recording tape; a door that turns centered on a support axis which spans in the direction of the height of the casing, and which opens and closes the opening; and a torsion spring that urges the door in the closed direction of the opening. The door of the cartridge includes a first guard portion set on the upper end portion of the door in the direction of the height having provided therein a first through-hole through which the support axis is inserted; and a second guard portion set on the bottom end portion of the door in the direction of the height having provided therein a second through-hole through which the support axis is inserted. The cartridge accommodates the torsion spring between the first guard portion and the second guard portion.

With the above-described aspect, the torsion spring is accommodated between the first and second guard portions so the turnable door is never urged upwards or downwards relative to the casing. Accordingly, problems such as unnecessary rotational momentum acting upon the door do not occur so the door can be opened and closed smoothly.

Further, the recording tape cartridge of the first aspect of the present invention can be configured such that protrusions are formed on the external surfaces of the first guard portion and the second guard portion at the casing side thereof around the first through-hole and the second through-hole so that a clearance in the height direction between the door and the casing is formed.

With the above-described aspect, a clearance in the height direction between the door and the casing can be maintained by forming the protrusions on the outer surfaces of the first and second guard portions so the rubbing resistance of the door relative to the casing can be reduced. The door can thus be opened and closed even smoother.

Also, the above-described recording tape cartridge can be made such that the casing is made from polycarbonate and the protrusions are made from polyoxymethylene.

Further, the recording tape cartridge of the first aspect of the present invention can be configured so that one end of the torsion spring is latched approximately in the center portion in the height direction of the door, and the other end of the torsion spring is set in the proximity of the upper end portion or the lower end portion in the height direction of the door and latched to the casing.

With the above-described aspect, the urging force of the torsion spring acts upon the approximate center portion of the door, so the door can be stably opened and closed. That is, problems such as unnecessary rotational momentum being acting upon the door do not occur so the door can be opened and closed smoothly.

Also, with the above-described recording tape cartridge, a latching unit that retains the other end of the torsion spring latched to the casing can be formed on the door.

With the above-described aspect, the other end of the torsion spring latched to the side of the casing can be temporarily retained so the door and the torsion spring can be assembled to the casing with ease. In other words, by configuring the device in this manner, the assembling compatibility of the torsion spring to the casing can be improved.

Further, the recording tape cartridge of the above-described aspect can be configured such that a latching unit that latches one end of the torsion spring is formed on the door.

With this aspect, one end of the torsion spring is latched with the latching unit so assembly of the door and the torsion spring to the casing can be performed with ease. With this configuration, the assembling compatibility of the torsion spring to the casing can be improved.

The recording tape cartridge of the first aspect of the present invention can be configured such that the casing includes a top casing and a bottom casing joined together. Also, the support axis can comprise: a protruding axis provided so as to protrude from one of the top casing and the bottom casing, the protruding axis inserted through the through-hole of the guard portion that is in the proximity of said casing; and a boss provided so as to protrude from the other casing (i.e., the casing opposite the casing of the protruding axis) such that it is inserted through the through-hole of the guard portion in the proximity of the other casing, the boss having a hole through which the tip of the protruding axis can be inserted. Further, a screw boss for joining the top casing and the bottom casing can be arranged in the vicinity of the support axis.

With the above-described aspect, even if impact hits the side of the casing where the door is provided due to, for example, the casing being dropped, that impact can be absorbed at the screw boss and not at the support axis. In other words, even if impact hits the casing in the vicinity of the door due to the cartridge being dropped, the device can be configured such that the impact does not affect the opening and closing of the door.

Further, the above-described aspect of the recording tape cartridge can be configured so that the coil of the torsion spring is accommodated between the boss and the second guard portion or the first guard portion.

With this aspect, the torsion spring inserted and fit onto the support axis does not move in the up and down directions (i.e., the direction of the height) so the urging force of the torsion spring can be applied with certainty to the approximate center portion of the door. Accordingly, the door can be stabilized and opened and closed smoothly.

Also, the recording tape cartridge of the above-described aspect can be configured such that the outer diameter of the boss is larger than the outer diameter of the protruding axis, and the diameter of the through-hole through which the protruding axis is inserted is smaller than the diameter of the through-hole through which the boss is inserted.

Also, the recording tape cartridge of the above-described aspect can be configured such that the boss extends to approximately the center portion in the height direction of the door.

A second aspect of the present invention is to provide a recording tape cartridge including: a casing that rotatably accommodates a single reel around which recording tape is wound; an opening formed in the casing for pulling out the recording tape; a door that turns centered on a support axis which spans in the direction of the height of the casing, and which opens and closes the opening; and a torsion spring that urges the door in the closed direction of the opening. The door includes: a first guard portion set on the upper end portion of the door in the height direction provided with a first through-hole through which the support axis is inserted; a second guard portion set on the bottom end portion of the door in the height direction provided with a second through-hole through which the support axis is inserted; and a third guard portion set approximately in the center portion of the height direction of the door provided with a third through-hole through which the support axis is inserted. The torsion spring is accommodated between the third guard portion and the first guard portion or the second guard portion.

With the above-described aspect, the torsion spring fitted and inserted on the support axis does not move in the up or down directions (i.e., in the height direction) due to the third guard portion provided in the approximate center portion in the height direction of the door, so the urging force of the torsion spring imparted to the door can be applied with certainty to approximately the center portion of the door. Accordingly, the door can be stabilized and opened and closed smoothly. Further, the latching unit that latches one end of the torsion spring becomes unnecessary if this third guard portion is provided.

Further, the recording tape cartridge of the second aspect of the present invention can also be configured such that protrusions are formed on the external surfaces of the first guard portion and the second guard portion at the casing side thereof around the first through-hole and the second through-hole so that a clearance in the height direction between the door and the casing is formed.

Furthermore, the recording tape cartridge of the above-described aspect can be configured such that the casing is made from polycarbonate and the protrusions are made from polyoxymethylene.

Also, the recording tape cartridge of the second aspect of the present invention can be configured such that one end of the torsion spring is latched approximately in the center portion in the height direction of the door, and the other end of the torsion spring is set in the proximity of the upper end portion or the lower end portion in the height direction of the door and latched to the casing.

Further, the recording tape cartridge of the above-described aspect can be configured such that a latching unit that retains the other end of the torsion spring latched to the casing is formed on the door.

Further, the recording tape cartridge of the above-described aspect can be configured such a latching unit that latches one end of the torsion spring is formed on the door.

The recording tape cartridge of the second aspect of the present invention can also be configured such that the casing includes a top casing and a bottom casing joined together; and so that the support axis includes: a protruding axis provided so as to protrude from either the top casing or the bottom casing, the protruding axis inserted through the through-hole of the guard portion that is in the proximity of said casing; and a boss provided so as to protrude from the other casing (i.e., the casing opposite the casing of the protruding axis) such that it is inserted through the through-hole of the guard portion in the proximity of the other casing, the boss having a hole through which the tip of the protruding axis can be inserted. Further, a screw boss for joining the top casing and the bottom casing can be arranged in the vicinity of the support axis.

The recording tape cartridge of the above-described aspect can also be configured such that the coil of the torsion spring is accommodated between the first guard portion and the third guard portion or the second guard portion and the third guard portion.

Further, the recording tape cartridge of the above-described aspect can be configured such that the through-holes provided in the first guard portion and the third guard portion or the second guard portion and the third guard portion are of the same diameter, and the coil of the torsion spring is supported and accommodated around the through-holes.

Further, the recording tape cartridge of the above-described aspect can be configured such that the boss extends to approximately the center portion of the height direction of the door.

Regardless of the aspect of the present invention, a recording tape cartridge is provided where a turnable-type door can be smoothly opened and closed while exhibiting no decrease in compatibility between the torsion spring and the casing.

What is claimed is:

1. A recording tape cartridge comprising:
a casing that rotatably accommodates a single reel around which recording tape is wound;
an opening formed in the casing for pulling out the recording tape;
a door that turns centered on a support axis which spans in the direction of the height of the casing, and which opens and closes the opening; and
a torsion spring that urges the door in the closed direction of the opening,
the door comprising a first guard portion set on the upper end portion of the door in the height direction having provided therein a first through-hole through which the support axis is inserted, and a second guard portion set on the bottom end portion of the door in the height direction having provided therein a second through-hole through which the support axis is inserted, wherein the torsion spring is accommodated between the first guard portion and the second guard portion.

2. The recording tape cartridge of claim 1, wherein protrusions are formed on the external surfaces of the first guard portion and the second guard portion at the casing side thereof around the first through-hole and the second through-hole so that a clearance in the height direction between the door and the casing is formed.

3. The recording tape cartridge of claim 2, wherein the casing is made from polycarbonate and the protrusions are made from polyoxymethylene.

4. The recording tape cartridge of claim 1, wherein one end of the torsion spring is latched approximately in the center portion in the height direction of the door, and the other end of the torsion spring is set in the proximity of the upper end portion or the lower end portion in the height direction of the door and latched to the casing.

5. The recording tape cartridge of claim 4, wherein a latching unit that retains the other end of the torsion spring latched to the casing is formed on the door.

6. The recording tape cartridge of claim 4, wherein a latching unit that latches one end of the torsion spring is formed on the door.

7. The recording tape cartridge of claim 1, wherein the casing comprises a top casing and a bottom casing joined together; and the support axis comprises:
- a protruding axis provided so as to protrude from one of the top casing and the bottom casing, the protruding axis inserted through the through-hole of the guard portion that is in the proximity of said casing; and
- a boss provided so as to protrude from the other casing such that it is inserted through the through-hole of the guard portion in the proximity of the other casing, the boss having a hole through which the tip of the protruding axis can be inserted, wherein
- a screw boss for joining the top casing and the bottom casing is arranged in the vicinity of the support axis.

8. The recording tape cartridge of claim 7, wherein the coil of the torsion spring is accommodated between the boss and the second guard portion or the first guard portion.

9. The recording tape cartridge of claim 7, wherein the outer diameter of the boss is larger than the outer diameter of the protruding axis, and the diameter of the through-hole through which the protruding axis is inserted is smaller than the diameter of the through-hole through which the boss is inserted.

10. The recording tape cartridge of claim 7, wherein the boss extends to approximately the center portion in the height direction of the door.

11. A recording tape cartridge comprising:
- a casing that rotatably accommodates a single reel around which recording tape is wound;
- an opening formed in the casing for pulling out the recording tape;
- a door that turns centered on a support axis which spans in the direction of the height of the casing, and which opens and closes the opening; and
- a torsion spring that urges the door in the closed direction of the opening,
- the door comprising: a first guard portion set on the upper end portion of the door in the height direction having provided therein a first through-hole through which the support axis is inserted; a second guard portion set on the bottom end portion of the door in the height direction having provided therein a second through-hole through which the support axis is inserted; and a third guard portion set approximately in the center portion of the door in the height direction having provided therein a third through-hole through which the support axis is inserted, wherein the torsion spring is accommodated between the third guard portion and the first guard portion or the second guard portion.

12. The recording tape cartridge of claim 11, wherein protrusions are formed on the external surfaces of the first guard portion and the second guard portion at the casing side thereof around the first through-hole and the second through-hole so that a clearance in the height direction between the door and the casing is formed.

13. The recording tape cartridge of claim 12, wherein the casing is made from polycarbonate and the protrusions are made from polyoxymethylene.

14. The recording tape cartridge of claim 11, wherein one end of the torsion spring is latched approximately in the center portion in the height direction of the door, and the other end of the torsion spring is set in the proximity of the upper end portion or the lower end portion in the height direction of the door and latched to the casing.

15. The recording tape cartridge of claim 14, wherein a latching unit that retains the other end of the torsion spring latched to the casing is formed on the door.

16. The recording tape cartridge of claim 14, wherein a latching unit that latches one end of the torsion spring is formed on the door.

17. The recording tape cartridge of claim 11, wherein the casing comprises a top casing and a bottom casing joined together; and the support axis comprises:
- a protruding axis provided so as to protrude from one of the top casing and the bottom casing, the protruding axis inserted through the through-hole of the guard portion that is in the proximity of said casing; and
- a boss provided so as to protrude from the other casing such that it is inserted through the through-hole of the guard portion in the proximity of the other casing, the boss having a hole through which the tip of the protruding axis can be inserted, wherein
- a screw boss for joining the top casing and the bottom casing is arranged in the vicinity of the support axis.

18. The recording tape cartridge of claim 17, wherein the coil of the torsion spring is accommodated between the first guard portion and the third guard portion or the second guard portion and the third guard portion.

19. The recording tape cartridge of claim 18, wherein the through-holes provided in the first guard portion and the third guard portion or the second guard portion and the third guard portion are of the same diameter, and the coil of the torsion spring is supported and accommodated around the through-holes.

20. The recording tape cartridge of claim 17, wherein the boss extends to approximately the center portion in the height direction of the door.

* * * * *